(12) United States Patent
Tokunaga et al.

(10) Patent No.: US 7,433,075 B2
(45) Date of Patent: Oct. 7, 2008

(54) METHOD AND IMAGE FORMING APPARATUS, AND PRINTING SYSTEM FOR RECORDING INVISIBLE INFORMATION RECORDING

(75) Inventors: Kazuyoshi Tokunaga, Ibaraki (JP); Kazuyuki Mitome, Ibaraki (JP); Seiji Kageyama, Ibaraki (JP)

(73) Assignee: Ricoh Printing Systems, Ltd., Tokyo (JP)

( * ) Notice: Subject to any disclaimer, the term of this patent is extended or adjusted under 35 U.S.C. 154(b) by 841 days.

(21) Appl. No.: 09/942,995

(22) Filed: Aug. 31, 2001

(65) Prior Publication Data

US 2002/0027674 A1 Mar. 7, 2002

(30) Foreign Application Priority Data

Sep. 1, 2000 (JP) .......................... P. 2000-265222
Jul. 6, 2001 (JP) .......................... P. 2001-205729

(51) Int. Cl.
*G06F 15/00* (2006.01)
*G06K 15/00* (2006.01)

(52) U.S. Cl. .................. 358/1.9; 358/1.15; 358/1.18

(58) Field of Classification Search ................ 358/1.14, 358/1.12, 1.15, 1.19, 1.9, 3.12, 1.18, 1.1, 358/1.2, 1.6, 3.1, 3.11, 1.11, 1.13, 528; 382/100, 382/139, 171, 190; 713/176; 399/140, 1; 347/188, 2, 3, 5; 283/72
See application file for complete search history.

(56) References Cited

U.S. PATENT DOCUMENTS

| | | | | | |
|---|---|---|---|---|---|
| 4,837,134 | A | * | 6/1989 | Bouldin et al. | 430/445 |
| 5,559,933 | A | * | 9/1996 | Boswell | 358/1.15 |
| 5,568,550 | A | * | 10/1996 | Ur | 382/306 |
| 5,633,126 | A | * | 5/1997 | Dickerson et al. | 430/496 |
| 5,919,730 | A | * | 7/1999 | Gasper et al. | 503/201 |
| 5,946,414 | A | * | 8/1999 | Cass et al. | 382/183 |
| 6,035,308 | A | * | 3/2000 | Yano et al. | 715/501.1 |
| 6,069,636 | A |   | 5/2000 | Sayuda et al. | |
| 6,354,630 | B1 | * | 3/2002 | Zhang et al. | 283/70 |
| 2003/0161496 | A1 | * | 8/2003 | Hayashi et al. | 382/100 |

FOREIGN PATENT DOCUMENTS

| | | |
|---|---|---|
| JP | 7-74926 | 3/1995 |
| JP | 2958396 | 7/1999 |
| JP | A-2000-175026 | 6/2000 |
| JP | 2000-188677 | 7/2000 |

OTHER PUBLICATIONS

Japanese Office Action dated Jan. 19, 2007 with English translation.
Japanese Decision of Rejection dated Apr. 20, 2007 (with English language translation).

* cited by examiner

*Primary Examiner*—Dov Popovici
(74) *Attorney, Agent, or Firm*—McGinn IP Law Group, PLLC

(57) ABSTRACT

Invisible information are recorded in the form of pixels invisible to the naked eye and at a print density invisible to the naked eye.

23 Claims, 7 Drawing Sheets

METHOD AND IMAGE FORMING APPARATUS, AND PRINTING SYSTEM FOR RECORDING INVISIBLE INFORMATION RECORDING

BACKGROUND OF THE INVENTION

1. Field of the Invention

The present invention relates to an image forming apparatus, such a digital copying machine, a digital printer, an ink jet printer, and a printer. More particularly, the invention relates to an invisible information recording method for recording an image being different from a visually perceived image on a part of a sheet of a paper on which an image is recorded, and an image forming apparatus using the same. Further, the invention relates to a printing system which easily retrieves the already printed document data from a part of a printed document formed by the image forming apparatus.

2. Description of the Related Art

In the field of the image forming technique, there is known a technique in which another information, such as text and characters, which is different from an image is added to the image for the purpose of increasing the amount of information or securing a secrecy.

Japanese Patent No. 2958396 discloses a technique to embed the additional information in a full line screen or a dot screen. In this technique, the additional information can be written into a location out of the full line or screen. In this connection, it is known that the additional information may be embedded into the location where the full line or screen is not printed if a screen is printed there to such an extent as not to be offensive to the eye. Where a high quality print is required, however, such a thin screen printing is not allowed frequently. Further, it is difficult to read the additional information, which is embedded into the thin screen. Further, where the printed screen that is so thin to be not offensive is used, it is difficult to read the information embedded therein.

Description of embedding the additional information into the image by various ways is found in "Fundamentals of Electronic Watermark" written by Kashio Matsui, published by Morikita Shuppan corporation in Japan. Matsui also describes that in the case of the image having a relatively high redundancy, such as the screen print, various methods to embed the additional information into the image are proposed and practically used. Further, he describes that the additional information may be embedded into the image having a low redundancy, such as a document image, by changing the character pitch, width or inclination.

In recent image forming apparatus, such as a digital copying machine, digital printer, ink jet printer, printer and the like, the resolution is remarkably improved, and is comparable with that in the photo-offset print. Accordingly, the character pitch, width, inclination or the like directly and adversely influences the print quality in the document image. For this reason, it is difficult to embed the additional information to the image by changing the character pitch, width or the inclination. Also in this case, so long as the information about the original character is unknown, it is difficult to read the information that is embedded on the basis of the changing of the character pitch, width or inclination.

Recently, there is proposed a recording method in which the additional information is embedded into the image without deteriorating the print quality in a manner that micro dots are printed on the image in an invisible fashion.

In the recording method, a diameter of each dot is typically 0.1 mm, and the dot of this size is visible. If the amount of the additional information is several bytes, an image containing the information embedded therein does not give the viewer an impression of its smearing by the embedded information. However, if the amount of the additional information embedded is several hundreds bytes or larger, an image containing the additional information embedded therein frequently has a thin black stripe appearing in its location where the additional information is stored. This is problematic where a high quality print is required.

It is well known that when invisible, isolated micro dots are embedded into the image, the recording reliability is deteriorated. The laser printer or the like sometimes suffers from an undesired phenomenon, called fog, in which toner particles attach to a location other than a desired recording area. In this case, it is difficult to distinguish the isolated informative micro dots from scattered toner particles. Also in the case of the ink jet printer, the isolated, micro dots as printed are absorbed into the recording sheet, so that a recording density reduces. Additionally, in this printer, fine particles, called ink satellite, which are generated when ink particles are separated, are present in addition to the ink particles used for the purpose of recording. When those fine particles attach to the recording sheet, it is difficult to distinguish the isolated micro dots from those fine particles attached.

Various techniques to embed additional information into the image have been proposed, as described above. Those proposals have commonly the following problems. As the result of embedding the additional information, the image quality is deteriorated. It is difficult to read out the embedded information. Further, when the micro dots that cannot be perceived are printed, the reliability is unsatisfactory.

The archiving printer, when printing, receives print data and a job ticket defining a print form by a network or another transmission means. The archiving printer prints the print data according to the job ticket. The printer, while printing, stores the print data into a recording medium, called an archive, which is provided in the archiving printer or the controller exclusively used for the archiving printer.

In the subsequent printing by the archiving printer, the user can obtain a desired print by merely issuing the job ticket. In this case, the user must designate a storage position of a document to be printed out in the printer or the archive of the controller. The user as a print user receives a report of a location for storing the document thereat in an easy-to-understand form from the application program. Accordingly, in the case of requesting a re-print, the storage location designation will present a little problem. When many kinds of printed documents, which are similar in version, are present, or when the printed documents are very old and their versions are unknown, a version of a document to be reprinted must be determined by using the information not contained in the printout and the job ticket. In this case, the user must take some measure for this. For example, he or she must prepare information for managing the versions and consume much labor.

SUMMARY OF THE INVENTION

Accordingly, an object of the present invention is to provide an image forming apparatus which is capable of embedding a large amount of additional information in an image in an invisible fashion and without deteriorating the image quality.

Another object of the invention is to provide means capable of reliably embedding the additional information, which is to be embedded in the image in the invisible form, in the image.

Another object of the invention is to provide a method which is capable of re-printing a document that was printed by the archiving printer by searching a storage location of the document by simple means.

The unique feature of the present invention resides in that information different from an image visually perceived is embedded so as to be invisible to the naked eye by utilizing a blank on a recording sheet of paper. To this end, a lot of additional information are embedded into a visible image by assigning information items, e.g., characters and symbols, to a plurality of patterns each consisting of dots invisible to the naked eye, which are distributed to such an extent that a variation of densities of the distributed dots cannot be visually perceived by the naked eye.

Specifically, a range of the dot size within which the dot is invisible to the naked eye is 75 μm or smaller. The dot pattern consisting of coarsely distributed invisible dots may be realized such that one dot is assigned to an image unit area consisting of 16 pixels (white). In other words, information is recorded in the form of presence or absence of one pixel in the unit area consisting of 16 white pixels.

Further, the invention provides means for recording such micro dot information items in high reliability.

In one means, one significant block of a pattern consisting of a plurality of significant blocks always retains information "1". At least one significant block of the remaining significant blocks is given a parity sum check function, thereby improving a reliability.

Another means is realized by recording one and the same information into a plurality of locations. Those information items stored in those locations, when read out, are superimposed. With this, if the information item at one location is missed out, it is covered with the information items at other locations, leading to the reliability improvement.

Further, the invention includes the recording or embedding of archive management information necessary for reprinting a document to be printed into the document when a document is printed by the archiving printer, and such means as a scanner for reproducing said recorded or embedded information. To reprint by the archiving printer, the user supplies a part of the printed document to said means for reproducing said embedded information. There producing means decodes the archive management information embed in a part of said document, and retrieves said document from said archiving printer or its controller, and the re-printing of said document is carried out.

DETAILED DESCRIPTION OF THE PRESENT INVENTION

The present invention will be described in detail with reference to the accompanying drawings.

In the eyesight of a human being, when the rays of light emitted from two different points are image formed on the retina at an angle of 1 minute ($\frac{1}{60}°$), a critical point allowing the human eye to distinctively perceive the formed images as two points is set at 1.0. To extend the meaning of the eyesight, a person having 1.0 of eyesight barely perceives distinctively two points, which are separated from each other by 75 μm, at the distance of distinct vision of 25 cm. In other words, the person having an eyesight of 1.0 cannot visually perceive a point or gap of less than 75 μm, located at a position of the distance of clear vision.

If a number of dots whose interspace is 75 μm or shorter are present within an image unit area, the human eye cannot perceive them distinctively, but can perceive them in the form of a density variation on the whole. It is said that a density difference that can distinctively be perceived by the human eye is about 0.01 when it is expressed in terms of optical density. Actually, in such a digital image forming apparatus as a printer or a digital copying machine, which expresses an image by the binary value, e.g., black and white, such an image as photograph may be depicted in a half tone of a unit of 8×8, i.e., 65 levels.

In case where one pixel as one image forming element in the digital image devices is 75 μm, and an image including one black pixel located at the center of a group of 8×8 pixels is used as one unit, and those image units are densely arranged, the human eye having the eyesight of 1.0 cannot perceive those black pixels.

The above case is one of the means for strictly disabling the human eye from distinguishing the density difference. It is not always to strictly disable the human eye from distinguishing the density difference, however. Normally, even if some degree of density is present around a digital image, such density is not offensive to the naked eye. Generally, a density around a digital image, which is 0.1 or less, is not offensive to the eye. Accordingly, no problem arises if the half tone is expressed using a unit of 3×3.

Figure 1:
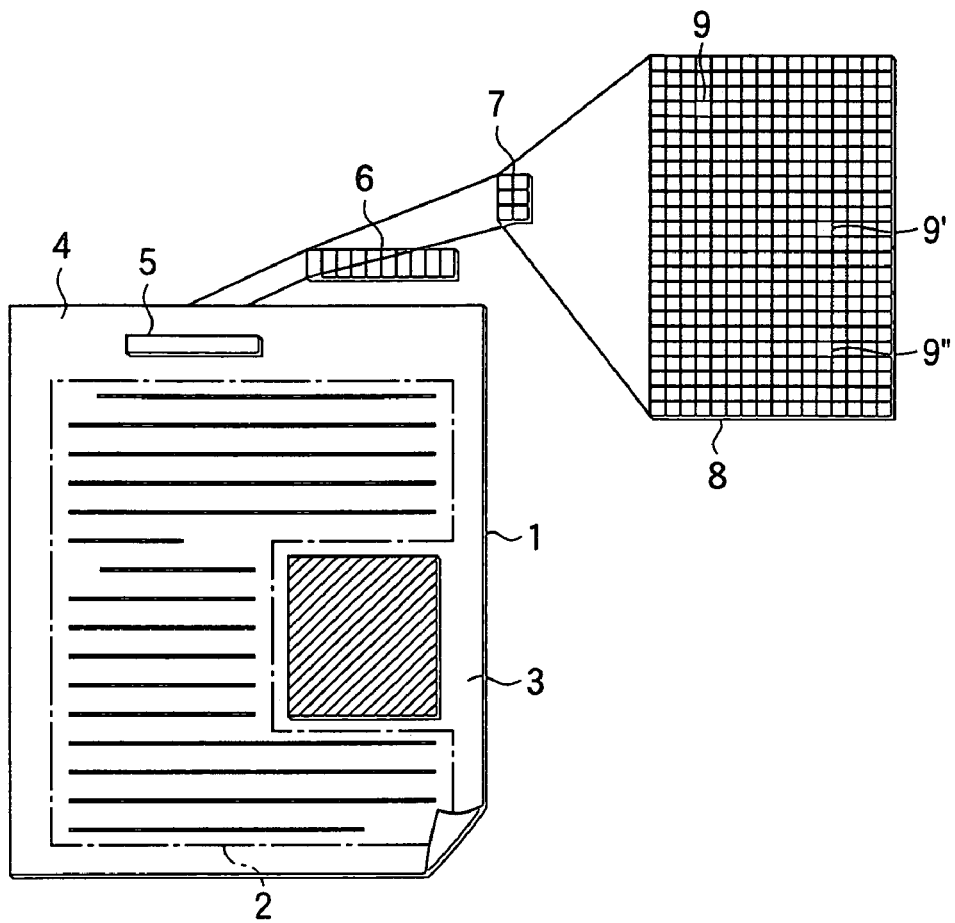
FIG. 1 is a diagram showing a model for explaining the principles of the present invention.

FIG. 1 is a diagram for explaining the principles of the present invention. Reference numeral 1 designates one page of a document, which is output from a digital image forming apparatus, such as a printer or a digital copying machine. Reference numeral 2 is a character area on the page of the document. Reference numeral 3 is an image area containing graphics, photograph or the like on the page.

4 is a blank area on the page, and 5 is an area containing additional information which is embedded in the blank area 4 and invisible to the eye or needs a careful watching to see it. An example of the information is storage management information for managing the storage of printed documents. Reference numeral 6 indicates a part of the additional information area illustrated in an enlarged form. As shown, the additional information area is divided every significant block. Numeral 7 indicates the detail of each significant block, and the significant block consists of six significant subblocks 8.

To further enlarge the significant subblocks 8 (a group of significant subblocks 8a, 8b, 8c, 8d, 8e, 8f), each subblock consists of pixels of 8×8. Reference numerals 9, 9' and 9" indicate information "1"s embedded in the significant block 7. A specific pixel located substantially at the center of the 8×8 matrix of pixels is used as a representative point of the subblock. The determination of whether the subblock is "1" or "0" is based on whether or not the information "1" is embed in the representative point.

While the significant blocks 6 each consists of six subblocks in the instance mentioned above, the number of subblocks forming one significant block is not limited to six, as a matter of course. In the braille notation system in Japan, one character of Kana (Japanese phonetic alphabet) is expressed using six points as a block. The braille notation system will be used for the embedding of information, for ease of explanation.

Figure 2:
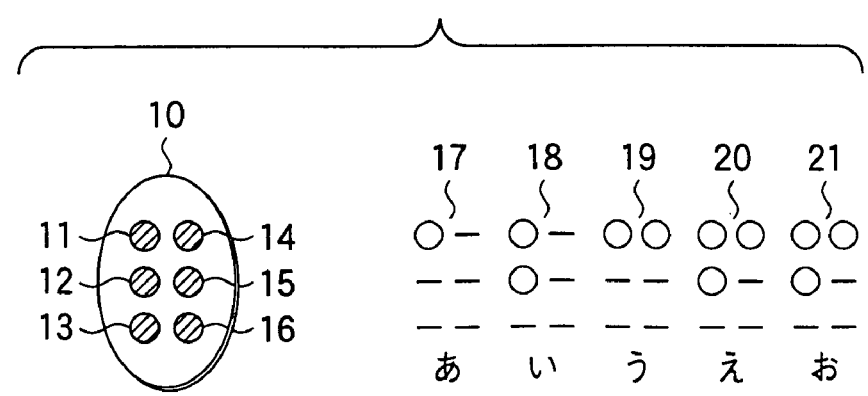
FIG. 2 is a diagram showing a model for explaining a part of the braille notation system.

FIG. 2 is a diagram for explaining a part of the braille notation system.

Reference numeral 10 designates one braille notation unit. Reference numerals 11 to 16 are six points forming the braille notation unit 10. A braille character consists of six points. In the braille notation, each phonetic character is expressed by the combination of tangible dots protruded. In the figure, a single dot designated by reference numeral 17 represents "あ" (Japanese phonetic character). A combination of two dots vertically arrayed and designated by numeral 18 represents "

". Another combination of two dots horizontally arrayed and designated by 19 represents "う". A combination of three dots, designated by 20, is "え". A combination of two dots, designated by 21, represents "お". In FIG. 2, black circles indicate protruded dots and symbols "-" are dots not protruded.

Thus, the notation system using six points as a block already exists. This notation may be applied to the information embedding means of the invention.

In the printer or copying machine designed so as to print 600 pixels per inch, for example, one character of information embedded using the notation system may be expressed by using an area of 1 mm in height and 0.67 mm in width. Accordingly, a blank area of 1 mm in height and 10 cm in width will suffice for the embedding of information of 147 characters.

In the instance mentioned above, one subblock consists of 8×8 pixels. For the general pixel construction, the number of pixels is preferably selected such that when the significant block is regarded as an image on the assumption that its subblocks are all "1"s, a pixel density is 0.1 or lower. In a case where the representative points of the subblocks are invisible to the naked eye, but the representative points are aggregated, the image area containing those representative points is "seen" to be thin black. This should be avoided. To avoid this, the representative points are preferably dispersed so as to secure the image density of 0.1 or less. More preferably, it is 0.01 or less. If so selected, there is no chance that the representative points are perceived.

Figure 3:
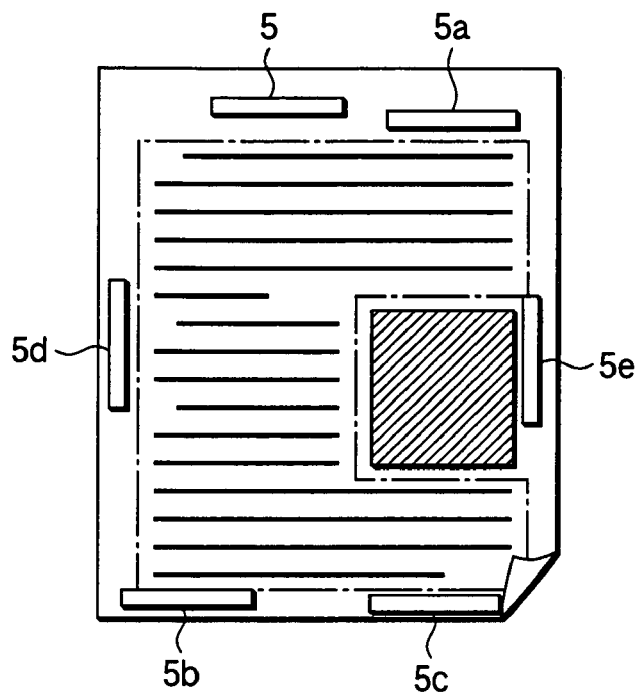
FIG. 3 is a diagram showing a model for explaining the invisible information embedded into a plurality of locations on one page of an image.

FIG. 3 shows an example where the invisible information 5 is embedded into a plurality of locations on one page of the document. In the FIG. 3 example, invisible information 5 and 5a are embedded in the upper blank on the page, and invisible information 5b and 5c are embed in the lower blank. The significant blocks 7 may be arranged not only in lateral direction but also in the vertical direction. Accordingly, the invisible information may be embedded on the right and left blanks while being vertically arranged. Those vertically arranged invisible information are denoted as 5d and 5e in the figure.

This technique of embedding the invisible information into a plurality of locations will improve the reliability.

Figure 4:
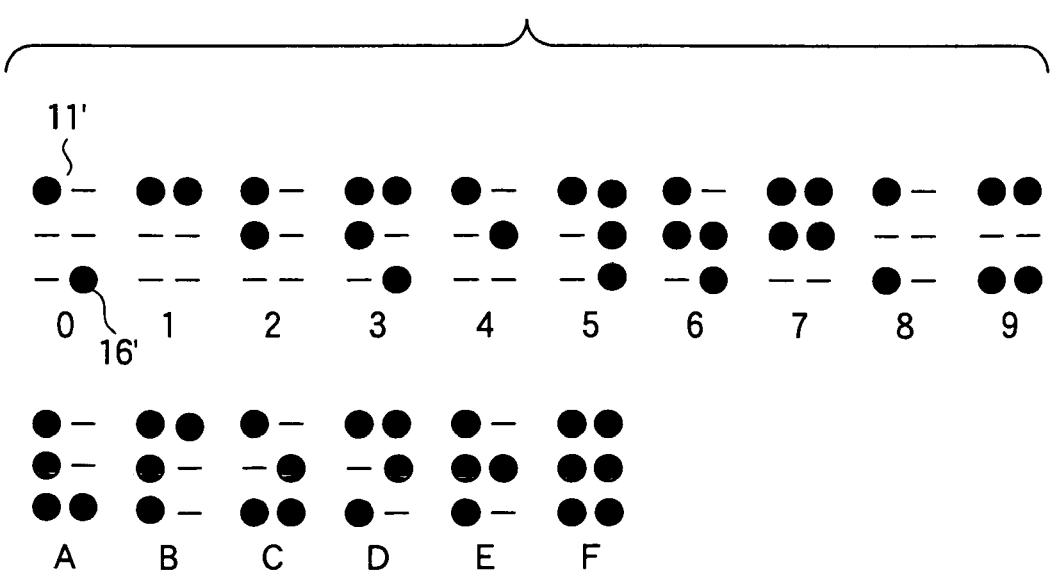
FIG. 4 is a diagram showing a model for explaining an example showing how to describe information by using the significant blocks.

FIG. 4 is a diagram exemplarily showing how to describe information by using the significant blocks 7 each consisting of six significant subblocks 8. To improve the reliability of the embedded information, Each significant block 7 contains a normally printing block 11' into which "1" is always written, and a parity check block 16' with which the significant block 7 has always an even number of "1"s. The remaining four blocks are set at "1" or "0" in accordance with information to be embedded.

When the significant block 7 thus constructed is used, 16 different information pieces may be recorded. With the fact that the number of "1"s contained in the position superiority block in which "1" is always present at the upper left position is an even number, check is made, at the time of reading, as to if the information is correctly printed.

Figure 5:
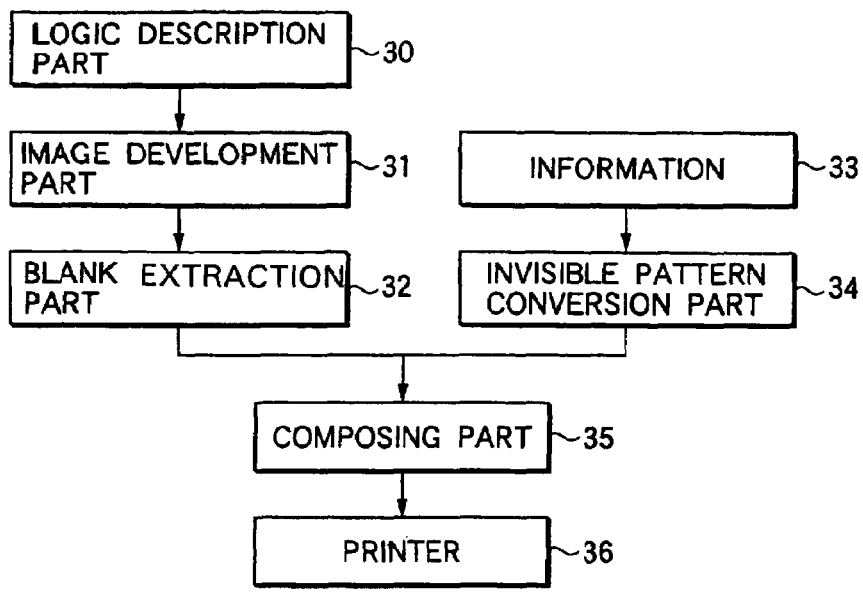
FIG. 5 is a diagram showing an algorithm for embedding invisible information according to the present invention.

FIG. 5 is a diagram showing an algorithm for embedding invisible information according to the present invention. In the figure, reference numeral 30 is a logic description part; 31 is an image development part; 32 is a blank extraction part; and 33 is information different from the information of an image visually perceived; 34 is an invisible pattern conversion part; 35 is a composing part; and 36 is a printer.

The logic description part 30 is apart described in codes, called a page description language. Generally, a page image printed by the printer contains such a logic description part. The codes of the logic description part 30 are interpreted by a program, called an interpreter, in the image development part 31, and developed into bitmap data which corresponds to a pattern in the page image in a ratio of 1:1.

The blank extraction part 32 extracts a blank or blanks from the print page image. Ideally, it extracts a plurality of rectangular blanks from the page image. The information 33 is prepared, which is different from the image to be printed, i.e., the image visually perceived. The information may contain detailed attributes of the printed page, file storing locations, author of the document, page correction history, and others. The information 33 different from the perceived image is converted into an invisible pattern as shown in FIG. 2, by the invisible pattern conversion part 34. The converted invisible pattern is combined with the blank extracted by the blank extraction part 32, and the resultant data is output to the printer 36.

To cope with a lack of the reliability caused when the micro dots are recorded, the present invention presents a method of generating the embedded information in high reliability by using means to be given below.

A first means is to embed the invisible information into a plurality of locations (5a, 5b, 5c . . . in FIG. 3) as well as one location of one page of the document (5 in FIG. 1), thereby improving the reliability of the embedded information.

Where the information is embedded into a plurality of locations, if the information is missed out, the information embedded in the remaining locations compensate for the missed information by superimposing the extracted patterns.

In a second means, one subblock of the significant block 7 as an information unit of the information to be embedded is used as a normally printing block, and one subblock is used as a parity check block. With this, the location of the significant block in one page of a document is clarified, and check is made as to if the embedding of information every subblock is reliable.

Figure 6:
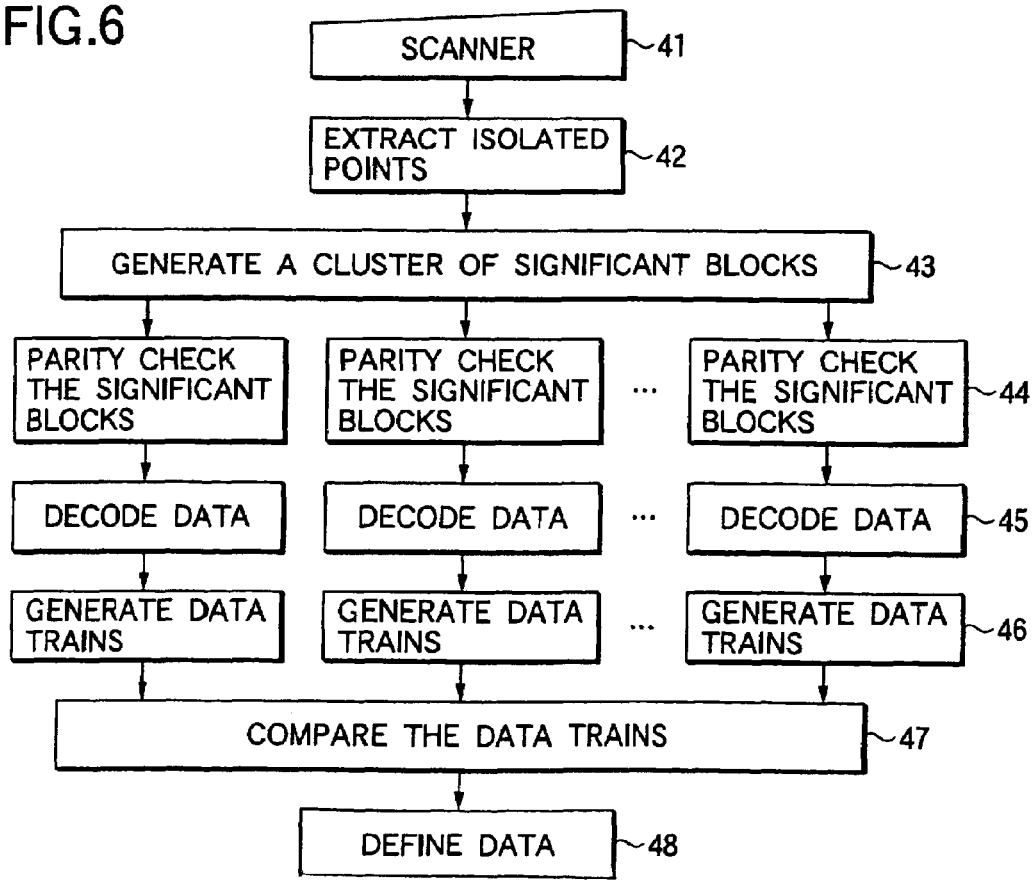
FIG. 6 is a diagram showing an algorithm for reading out the invisible information embedded according to the invention.

FIG. 6 is a diagram showing an algorithm for reading out the invisible information embedded according to the invention. In the figure, reference numeral 41 designates a scanner; 42 is an isolated-point extracting part (e.g., which can extract isolated points); and 43 is a superiority-block cluster detecting part (e.g., which can generate a cluster of significant blocks). In a cluster of a plurality of significant blocks, reference numeral 44 is a pattern decoder part (e.g., which can parity check the significant blocks); 45 is a data decoder part (e.g., which can decode data); 46 is a data-train generator part (e.g., which can generate data trains); 47 is a data-train comparator part (e.g., which can compare the data trains); and 48 is a data defining part (e.g., which can define data).

An image is readout of a printed page containing invisible information embedded therein by means of the scanner 41. As seen from FIG. 2 and also FIG. 4, the invisible information is represented by a pattern consisting of isolated points each located at the central part of the subblock consisting of 8×8 pixels. One page of the image is scanned while applying a pattern mask of significant subblocks thereto. As a result, only the isolated points are extracted.

Those isolated points are processed by the utilization of a regularity of the pattern to detect a cluster of significant blocks.

Each superiority block is parity checked to check as to whether or not the number of "1"s in the significant block is an even number. If the number of "1"s is an odd number, the data is indefinite and reserved, and a train of data inclusive of the reserved data is generated.

The reason why the parity check is performed using an even number of data items follows. In a case where an even number of data items is used for the parity check, when one point of "1" contained in the significant block is not recognized, it is regarded that no superiority block is contained in that data. It is for this reason that the even number of data items is used for the parity check.

The reason why a subblock in which a fixed position always contains "1" is provided follows. If so done, the subblock will periodically appear. Accordingly, the missing of the significant block recognition will readily be found.

A cluster of significant blocks detected is then processed in a similar way, to form data trains associated therewith. During the process of comparing the detected data trains, it is possible to define the reserved data.

As seen from the description mentioned above, even the information unstably recorded in the form of micro dots can be read out reliably.

A printer in a document printer system for implementing the invention and a printing system will be described hereunder.

Figure 7:
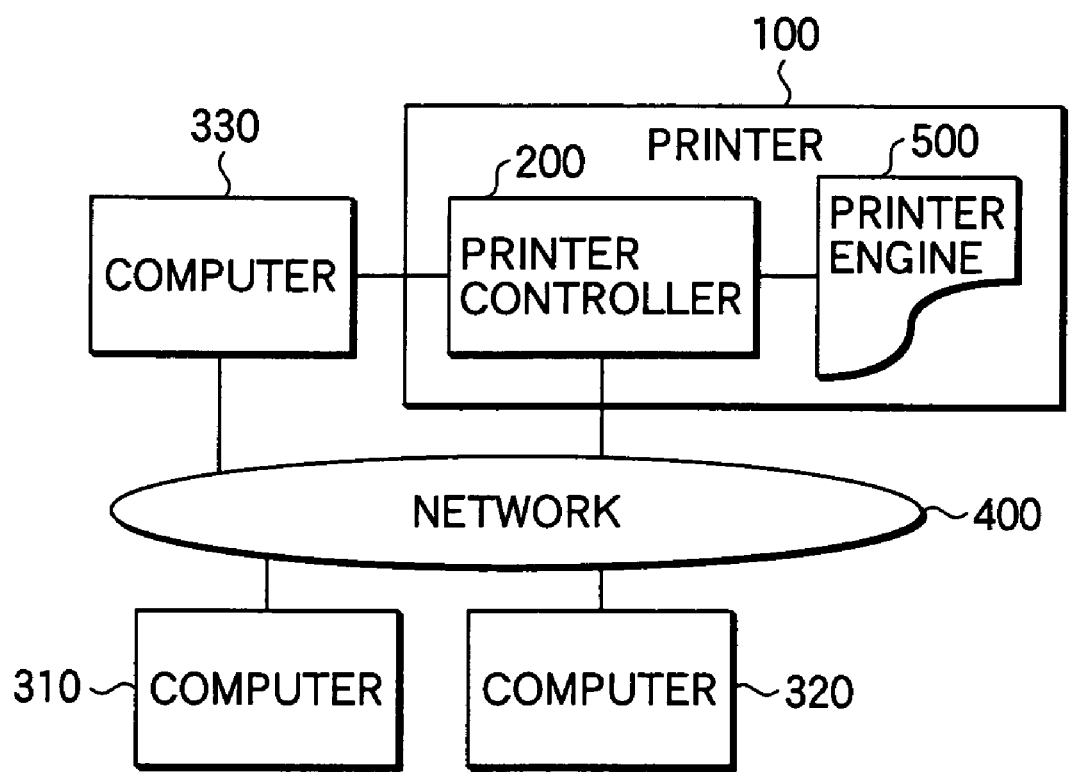
FIG. 7 is a diagram showing in model form a printer in a document printer system and a printing system, which are constructed according to the invention.

FIG. 7 shows an arrangement of an archiving printer in a document printer system and a printing system, which are constructed according to the invention. The printing system contains a network 400, a first computer 310, a second computer 320, a third computer 330, and a printer archive 100. Those computers (310, 320, 330) and the printer 100 are connected by the network 400.

The printer 100 includes a printer controller 200 and a printer engine 500. The printer controller receives command streams of a document which is described in the print command format (referred to as a PDL document) from each computer (310, 320, 330), and converts the command streams into dot image data, and sends the dot image data to the printer engine 500. The printer engine 500 receives the dot image data, and physically prints the data on a recording sheet.

Each computer sends requests of document printing, document storing and the like to the printer, and is also called a client. Subsequently, the computer will frequently be referred to as a client.

Each computer (310, 320, 330) instructs the printer to convert document data formed by an application software into the PDL document, and to execute a process of printing the PDL document and/or a process of storing the same.

Further, each computer (310, 320, 330) instructs the printer to execute a process of printing the PDL document, which is stored in a file or the like of each computer, and/or a process of storing the same.

Figure 8:
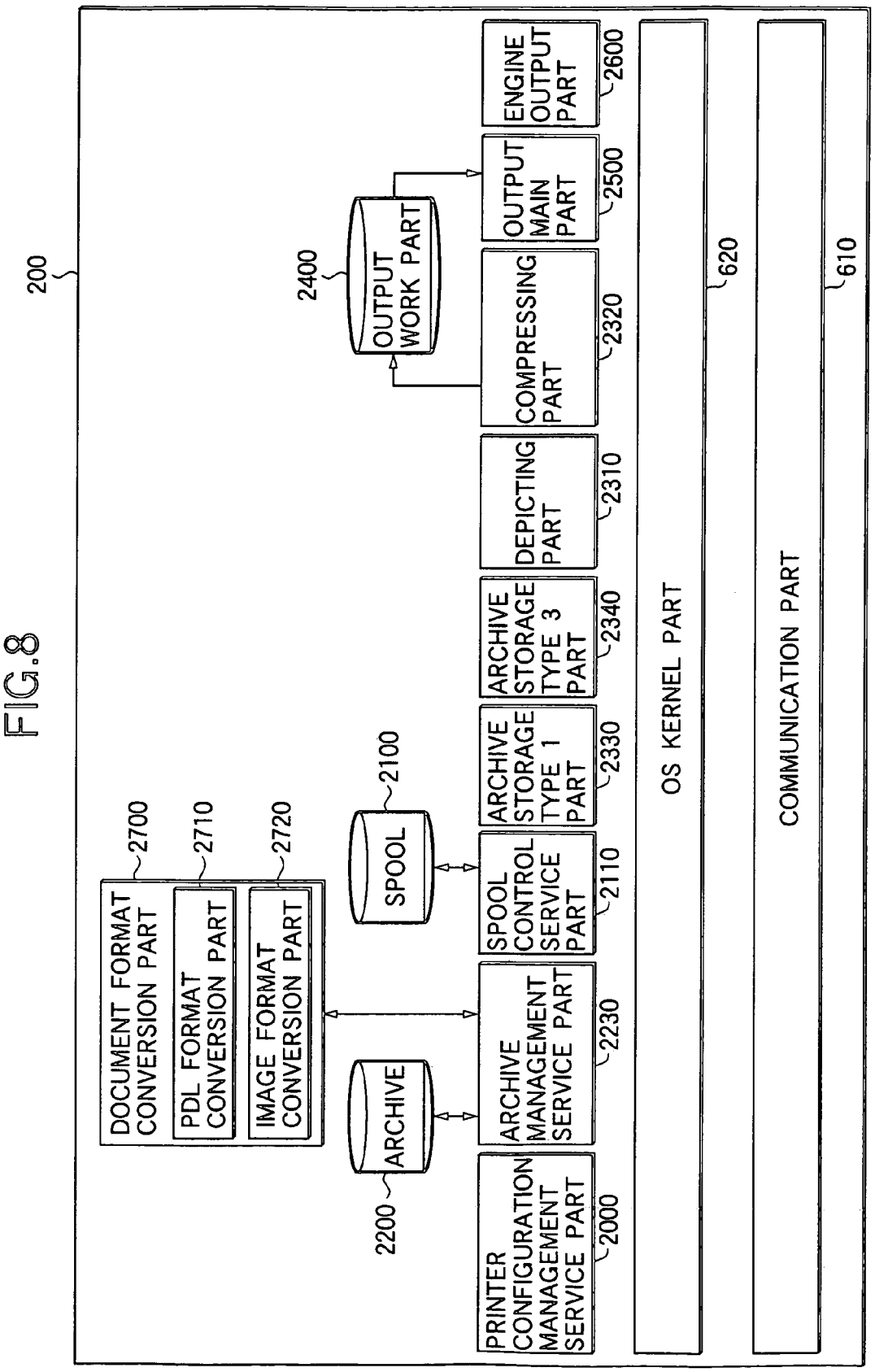
FIG. 8 is a diagram showing in model form an arrangement of a printer controller in the invention.

FIG. 8 is a diagram showing in model form an arrangement of a printer controller in the invention.

Figure 9:
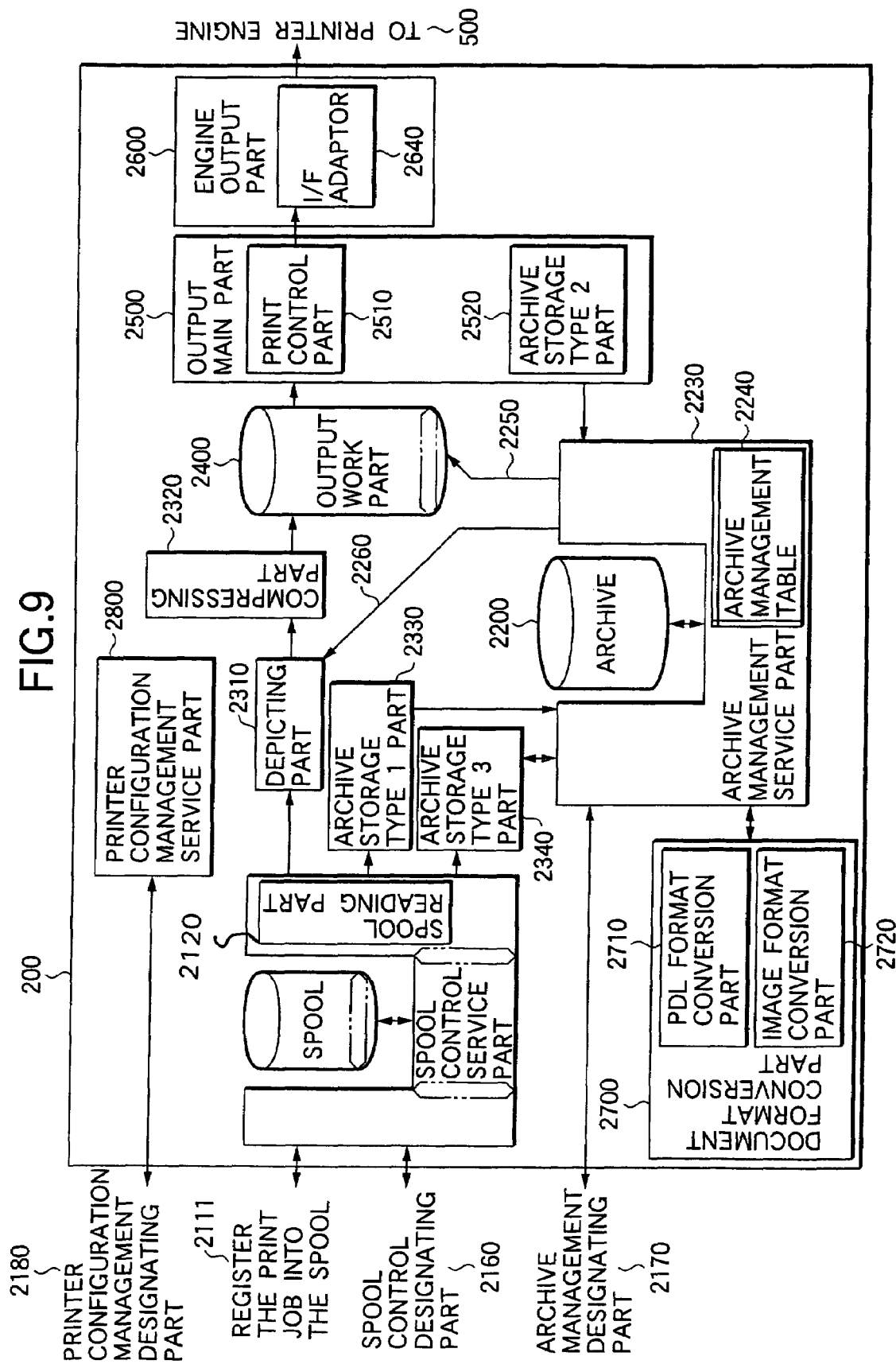
FIG. 9 is a diagram showing in model form a control system for the printer controller.

FIG. 9 is a diagram showing in model form a control system for the printer controller.

The printer controller designated by reference numeral 200 is made up of a communication part 610, an OS kernel part 620, a spool 2100, an archive 2200, an output work part 2400, and the respective processing parts of the OS kernel part 620.

The OS kernel part 620 is a basic software (also called an operating system) for controlling a hardware forming the printer controller 200, a user interface and the like.

The communication part 610 contains a hardware and a software which enables the printer 100 to communicate with various devices (computer, printer, scanner and the like) through the network 400. The OS kernel part 620 may be regarded as a part of the communication part 610. However, in the embodiment, it is treated as a separate component for the purpose of definitely describing its function.

The spool 2100, the archive 2200 and the output work part 2400 will now be described.

The spool 2100 is a queue which receives and registers therein a print request that each computer (310, 320, 330) issues to the printer controller 200. The printer controller 200 registers the print requests as print jobs in the spool 2100 in the receiving order. In this case, a pair of a) management information containing job names (with consecutive numbers) for managing the print jobs, registering date, document size and the like, and b) the PDL document as the contents actually printed are registered as a file. The registered print jobs are read out in the receiving order by a spool readout part 2120 in a spool control service part 2110 shown in FIG. 8, and transferred to a post stage of the print process.

The archive 2200 is a storage part into which the printer controller 200 stores the document in response to a document storing request that each computer (310, 320, 330) issues to the printer controller 200. Various requests on reference to the archive 2200, addition, delete, reprint, display, edit and the like are received and processed by an archive management service part 2230. Those various requests are processed as requests on the data writing and reading to and from the archive, and others. An archive management table 2240 is provided for remarkably improving the access performance of the archive management service part 2230 when it accesses the archive 2200, specifically an archived document group 2210.

The output work part 2400 is used as a work area when the printer controller 200 operates for the document printing or stores the document in the dot image format into the archive 2200.

A document format conversion part 2700 converts the archive format of the document stored in the archive 2200 into the display/edit format. The document format conversion part 2700 comes in a PDL format conversion part 2710 and an image format conversion part 2720.

Figure 10:
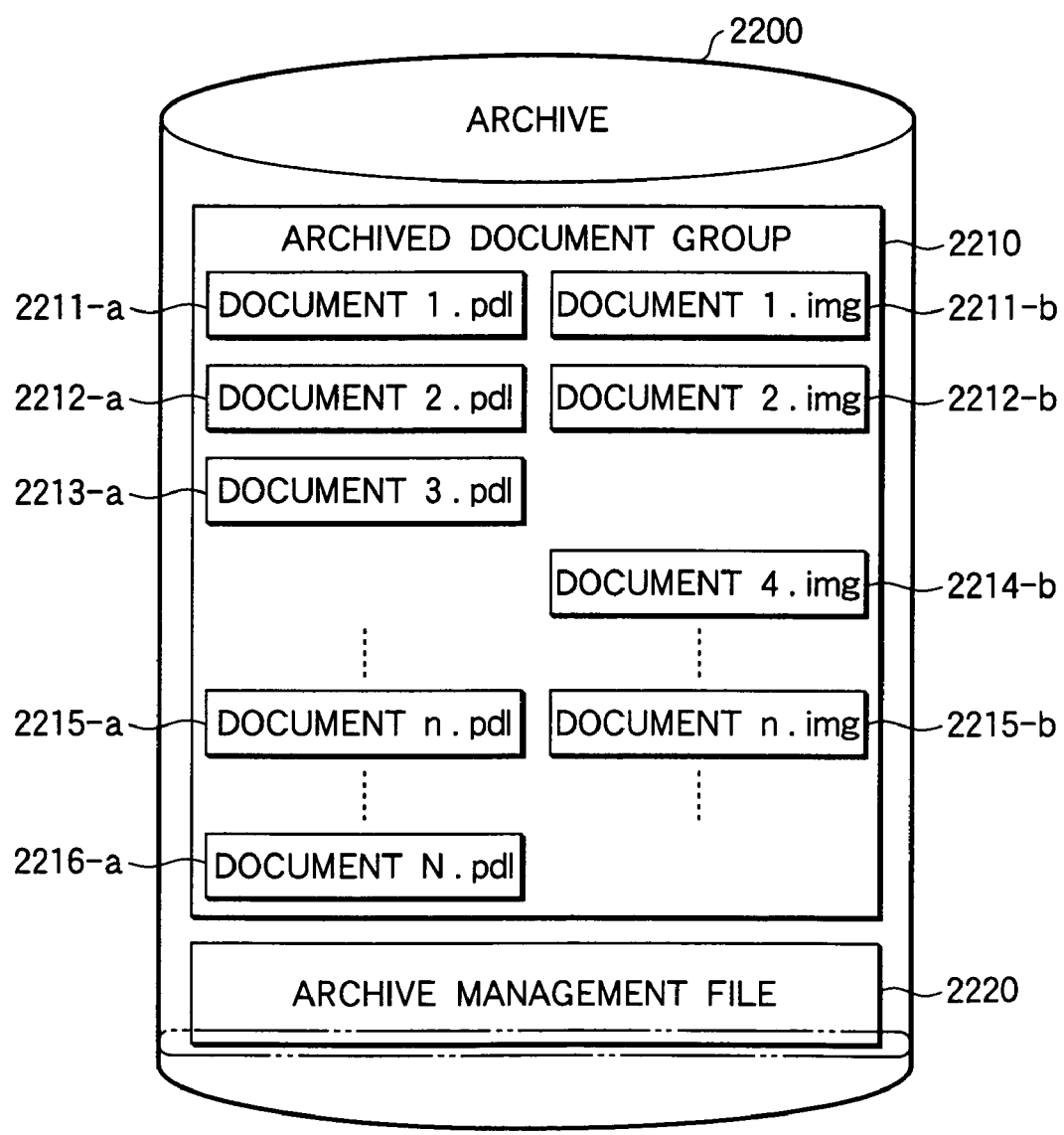
FIG. 10 is a diagram useful in explaining an archive of the printer controller in the invention.

FIG. 10 is a diagram useful in explaining the archive of the printer controller in the invention.

The archive 2200 includes an archived document group 2210 and an archive management file 2220.

The archived document group 2210 is the actual storage of documents, and the documents may be stored in the PDL format and/or the dot image format. Specifically, the documents may be stored in any of the formats: a) the PDL format and the dot image format, b) the PDL format, and c) the dot image format.

Any of those formats when the document is stored is designated as a parameter when the each computer (310, 320, 330) sends a document storing request to the printer controller 200. The parameter may be replaced with a default value or a previous-value. The default value is a value set at the time of initializing and installing. The previous-value is a parameter used for designating the data format in the preceding document storing.

In FIG. 10, a document 1 is stored in both the PDL format (2211-*a*) and the dot image format (2211-*b*). Documents 2 and n are also stored in both the formats (2212-*a*, 2212-*b*, 2215-*a*, 2215-*b*). Documents 3 and N are stored in the PDL format (2213-*a*, 2216-*a*). A document 4 is stored in the dot image format (2214-*b*).

The archive management file 2220 is a management file for managing the storage of the archived document group 2210 and for speeding up the operation to the archived document group 2210.

Further, an archive management table 2240 maybe provided in addition to the archive management file 2220. In the archive management table 2240, the same contents as of the archive management file 2220 are stored in a memory. The provision of the archive management table brings about considerable improvement of the access performance of the archive management service part 2230 when it accesses the archive 2200, more specifically, the archived document group 2210.

The output work part 2400 is used as a work area when the printer controller 200 operates for the document printing or stores the document in the dot image format into the archive 2200.

In the field of software, those processing parts are packaged every process unit called a task or process. The OS kernel part 620 selects the execution of those tasks depending on the input/output between the printer controller, external devices and devices, and a processing state in the printer controller. With this, the performances on the printing and storing by the printer controller are improved, and the print throughput and the storage throughput are increased.

Specific tasks are a printer configuration management service part 2000, archive management service part 2230, spool control service part 2110, archive storage type 1 part 2330, depicting part 2310, compressing part 2320, output main part 2500, and engine output part 2600.

Thus, the printer controller with the archive efficiently manages the archived document group by use of the archive management file. It is difficult to know a storage location of a document that is printed and output directly from the printed document. Particularly, in the case of documents being slightly different, e.g., document shaving different versions, it is very difficult to find the storage locations of such documents.

When such archived documents are printed out, a property on such a document is printed on each page in an invisible manner. The property contains information on the archive for the documents to be printed, data of forming the document, author of the document, document version information, various information on the print job management, and the like.

Accordingly, in the case of the printed page containing the invisible information, the information may be read out of the page by use of a scanner. The invisible information contains a storage location of the printed page. Because of this, the page and the whole document containing the printed page as well may be reprinted.

It should be understood that the reliable, invisible-information reading algorithm of FIG. 6 is presented by way of example, and that in the field of software, other methods of improving the reliability are known. One of the methods is to remove noise by superimposing patterns of a plurality of positions. Another method is that decision is made depending on as to whether or not a dot is present at a position predicted by utilizing the regularity. Yet another method is that the archive management information is designed to be the fixed length data, and check is made as to whether or not such data is damaged. A further method is to apply the parity check to the whole archive management information embedded. The method of reliably reading out the data is not essential to the invention, and hence no further description on it will be given here.

In the description given above, a state that the archive management information to be recorded in a printed document is invisible to the eye or needs a careful watching to see it, is realized by dispersing micro pixels. The same state is realized by any of other means.

The printing is made by using a yellow color developer. Where it is used, it is very difficult for the human eye to recognize the resolution and gradation. By so doing, the number of pixels as the representative points of the subblock may be increased. The number of pixels of the 8×8 matrix of the subblock is reduced. The decrease of the pixel line integer of the subblock indicates that an amount of information embedded per unit area is increased, viz., much additional information may be embedded.

The color developer used for printing the archive management information may be ultraviolet rays color developing ink or toner. When the ultraviolet rays color developer is used for printing, the ink or toner emits fluorescent light only under ultraviolet rays. Accordingly, in a normal state, the printed contents are not perceived by the naked eye. In this case, to read the printed archive management information, an ultraviolet rays light source and a sensor for sensing the same must be provided. However, since it is perceived by the naked eye in a normal state, such a restriction that an invisible state is set up at the time of recording is completely removed. Accordingly, the print pattern and the data format of the archive management information maybe designed without any restriction.

As seen from the foregoing description, additional information different from the original image may be embedded into the image without deteriorating the image quality in a state that the additional information is invisible, and the embedded additional information may readily be read out.

In the invention, when the document is printed by the archiving printer, the archive management information of a document to be printed is embedded to a part of the document in an invisible state. Accordingly, when a page printed out contains the invisible information, the archive management information embedded is read out by use of a scanner. And the printed document is readily be reprinted.

What is claimed is:

1. An invisible information recording method comprising:
   extracting a location of at least one blank area of a page image of a sheet of paper, wherein said location of said at least one blank area is different from a location of an image, which is visible to the naked eye, of said page image of said sheet of paper; and
   recording a digital image on said location of said at least one blank area on said sheet of paper;
   wherein said digital image comprises information in the form of pixels so sized as to be invisible to a naked eye and at a print density invisible to the naked eye, wherein said extracting comprises extracting a plurality of locations of blank areas from said page image of said sheet of paper, wherein said plurality of locations of blank areas extracted from said page image of said sheet of paper include at least one blank area which is located in a position on said page image of said sheet of paper other than a location of a margin of said sheet of paper, wherein no part of said digital image is recorded in said location of said image of said page image of the sheet of paper, and wherein a print density invisible to the naked eye is such that the pixels each so sized as to be invisible to the naked eye are coarsely distributed and an image density is 0.1 or less.

2. The invisible information recording method according to claim 1, wherein each of the pixels so sized as to be invisible to the naked eye is 75 μm or less in diameter.

3. The invisible information recording method according to claim 2, wherein each of the pixels so sized as to be invisible to the naked eye corresponds to one or a plurality of image forming elements used for a device for forming a digital image.

4. The invisible information recording method according to claim 1, wherein each of the pixels so sized as to be invisible to the naked eye is printed using a yellow color developer.

5. The invisible information recording method according to claim 4, wherein the yellow color developer is formed of an ink or toner.

6. The invisible information recording method according to claim 1, wherein each of the pixels so sized as to be invisible to the naked eye is printed using an ultraviolet rays color developer.

7. The invisible information recording method according to claim 6, wherein the ultraviolet rays color developer is formed of an ink or toner.

8. An invisible information recording method comprising:

extracting a location of at least one blank area of a page image of a sheet of paper, wherein said location of said at least one blank area is different from a location of an image, which is visible to the naked eve, of said page image of said sheet of paper; and recording a digital image on said location of said at least one blank area on said sheet of paper;

wherein said digital image comprises information in the form of pixels so sized as to be invisible to a naked eye and at a print density invisible to the naked eye, wherein said extracting comprises extracting a plurality of locations of blank areas from said page image of said sheet of paper, wherein each of the pixels so sized as to be invisible to the naked eve is 75 μm or less in diameter, and wherein a print density invisible to the naked eye is such that the pixels each so sized as to be invisible to the naked eye are coarsely distributed and an image density is 0.1 or less.

9. An invisible information recording method comprising:

extracting a location of at least one blank area of a page image of a sheet of paper, wherein said location of said at least one blank area is different from a location of an image. which is visible to the naked eye, of said page image of said sheet of paper; and recording a digital image on said location of said at least one blank area on said sheet of paper;

wherein said digital image comprises information in the form of pixels so sized as to be invisible to a naked eye and at a print density invisible to the naked eye, wherein said extracting comprises extracting a plurality of locations of blank areas from said page image of said sheet of paper, and wherein each print density invisible to the naked eye is such that such a block that one or a plurality of image forming elements of a digital image forming apparatus is a representative point in a unit consisting of 16 image forming elements is a recording unit.

10. The invisible information recording method according to claim 9, wherein adjacent six recording units form one significant block, and information is recorded in the significant block.

11. The invisible information recording method according to claim 10, wherein at least one of the significant blocks comprises a recording unit which always represents "1".

12. The invisible information recording method according to claim 10, wherein at least one of the significant blocks comprises a recording unit representative of a parity check.

13. The invisible information recording method according to claim 1, wherein such information formed by coarsely distributing the pixels each so sized as to be invisible to the naked eye so as to include a print density invisible to the naked eye is recorded into said plurality of locations of blank areas on one page of a digital image.

14. A recording apparatus for recording invisible information on a sheet of paper according to any one of claims 1 to 11.

15. A printing system including an archiving printer which prints a document upon receipt of a request of printing the document, and at the same time stores the document as document data into an archive, and upon receipt of a request of reprinting the document stored, reprints the document by using the document data stored in the archive, the archiving printer comprising:

a blank area extracting section that extracts locations of a plurality of blank areas in a page image of a document, wherein' said locations of each of said plurality of blank areas is different from a location of an image, which is visible to the naked eye, in said page image of said document; and a recording section for recording archive management information on storage locations of documents in the archiving printer in to at least one of said plurality of blank areas of said document when the document is printed, in a state that the information is invisible to the human eye or needs a careful watching to see the information;

a reading section for reading out the information being recorded in the printed document in a state that the information is invisible to the human eye or needs a careful watching to see the information, by reproducing the document printed by the archiving printer by means of reproducing means; and a knowing section for knowing the archive management information of the printed document from the read out information, wherein said plurality of locations of blank areas extracted from said page image of said sheet of paper include at least one blank area which is located in a position on said page image of said sheet of paper other than a location of a margin of said sheet of paper, wherein no part of said digital image is recorded in said location of said image of said page image of the sheet of paper, and wherein the state of the information which is invisible to the human eye is such that pixels of the information each so sized as to be invisible to the human eye are coarsely distributed and an image density is 0.1 or less.

16. The printing system according to claim 15, wherein the recording section embeds the archive management information of the document at the time of printing the document in a state that the information is invisible to the human eye or needs a careful watching to see the information;
the recording section records one and the same information into said plurality of locations of blank areas; and
the reading section includes an optical scanning section for scanning at least a part of the document.

17. The printing system according to claim 15, wherein the recording section records the archive management information of the document at the time of printing the document in a state that the information is invisible to the human eye or needs a careful watching to see the information;
the recording section records one and the same information into said plurality of locations of blank areas; and
the reading section includes an optical scanning section for scanning at least a part of the document.

18. The invisible information recording method according to claim 1, wherein said recording the digital image comprises recording the digital image only in one of said plurality of blank areas of said page image of said sheet of paper.

19. The invisible information recording method according to claim 1, wherein said recorded information comprises at least one of a horizontal arrangement and a vertical arrangement in said plurality of blank areas of said page image of said sheet of paper.

20. The invisible information recording method according to claim 1, wherein said extracting comprises extracting a plurality of substantially rectangular blank areas from said page image of said sheet of paper.

21. The invisible information recording method according to claim 1, wherein said recording the digital image comprises recording a copy of at least a portion of said information into at least one other location of said plurality of locations of said blank areas.

22. An invisible information recording method comprising:
extracting locations of a plurality of blank areas of a page image of a sheet of paper, wherein each of said locations of said blank areas are different from locations of images, which are visible to the naked eye, of said page image of said sheet of paper; and
recording a plurality of image forming elements used for a device for forming a digital image in said locations of said blank areas on said sheet of paper;
wherein said digital image comprises information in the form of pixels so sized as to be invisible to a naked eye and at a print density invisible to the naked eye,
wherein a print density invisible to the naked eye is such that the pixels each so sized as to be invisible to the naked eye are coarsely distributed and an image density is 0.1 or less,
wherein said recorded information comprises at least one of a horizontal arrangement and a vertical arrangement in said blank areas of said page image of said sheet of paper, and
wherein said recording the digital image comprises recording a copy of at least a portion of said information into at least one other location of said plurality of locations of said blank areas.

23. The printing system according to claim 15, wherein the state of the information which is invisible to the human eye is such that such a block that one or a plurality of image forming elements of a digital image forming apparatus is a representative point in a unit consisting of 16 image forming elements is a recording unit.

* * * * *